June 12, 1956  G. CLOTAR  2,749,801
REFLECTIVE OPTICAL PROJECTION SYSTEMS
Filed Nov. 9, 1951

INVENTOR
GILBERT CLOTAR
BY
Louis L. Gagnon
ATTORNEY

United States Patent Office 2,749,801
Patented June 12, 1956

2,749,801

REFLECTIVE OPTICAL PROJECTION SYSTEMS

Gilbert Clotar, Stamford, Conn., assignor to American Optical Company, Southbridge, Mass., a voluntary association of Massachusetts Application November 9, 1951, Serial No. 255,716

16 Claims. (Cl. 88—57)

This invention relates to improvements in optical systems and has particular reference to novel, simple, efficient and inexpensive projection optical systems of the reflective type and method of making the same.

One of the principal objects of this invention is to provide a reflective optical projection system in which the useful aperture of the system is increased whereby increased contrast is obtained without serious loss of usable light.

Another object is the provision of a system of the above character wherein direct transmission of light from the object source to the image-receiving area is prevented.

Another object is to provide an improved reflective optical projection system which makes use of practically all usable light emanating from the object source while eliminating scattered light and avoiding direct light which would normally cause superimposition of images at the image-receiving area.

Another object is the provision of improved diaphragm or baffling means for a reflective optical projection system which baffling means is of a controlled size and shape which may be varied to control the distribution of light throughout the image-receiving area.

Figure 1:
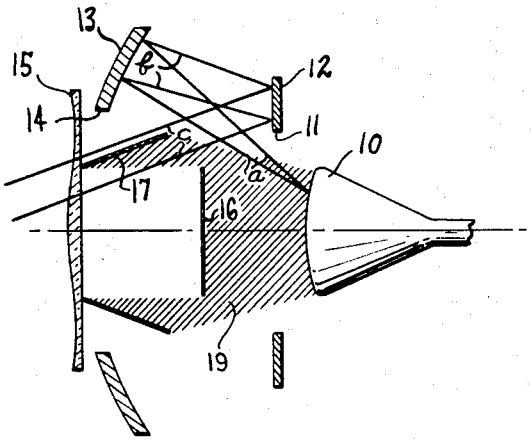
Figure 2:
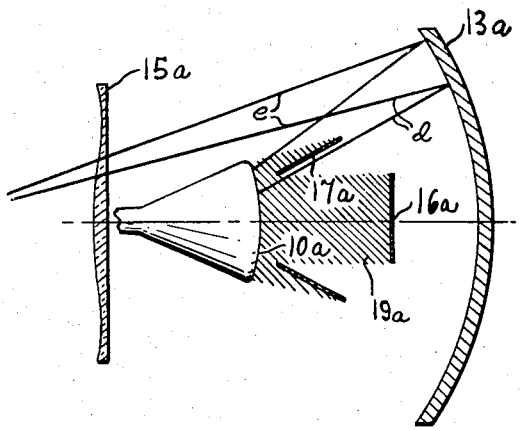
Figure 3:
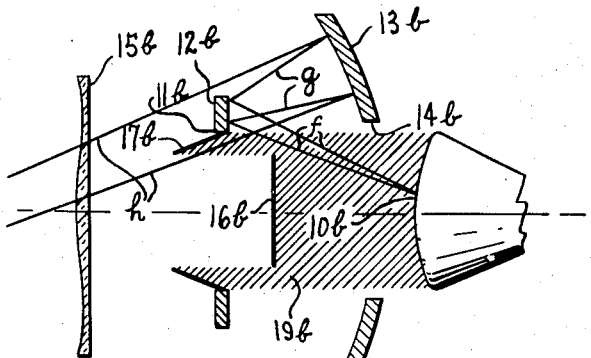
Figure 4:
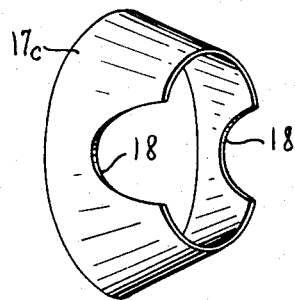
Figure 5:
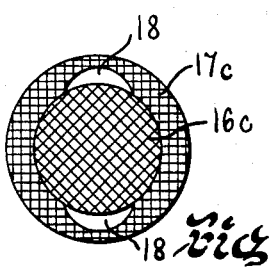
Figure 6:
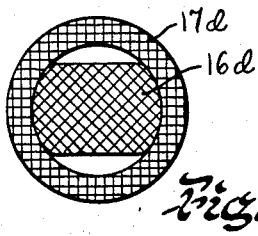

Other objects and advantages of the invention will become apparent from the following description taken in connection with the accompanying drawing, in which, Figs. 1, 2 and 3 are various image-projection systems embodying the invention;

Fig. 4 is a perspective view of a diaphragm formed in accordance with the teachings of this invention; and Figs. 5 and 6 are schematic illustrations of two different methods of controlling the distribution of light at the image-receiving area.

Referring more particularly to the drawing wherein like characters of reference designate like parts throughout the several views, the invention has been illustrated in Fig. 1 as applied to a reverse folded Schmidt projection system wherein light rays "a" emitted by a source such as the fluorescent screen of a cathode ray tube 10 are projected through the central opening 11 of a flat annular mirror 12 onto a spherical mirror 13 from which they are reflected as rays "b" back onto the annular flat mirror 12, from which they are again reflected as rays "c" through a central opening 14 in the spherical mirror 13 to a correcting element 15 such as a Schmidt plate or other suitable lens. The correcting element 15 compensates for spherical aberration introduced by the mirror 13 and, in the system of Fig. 1, is preferably positioned adjacent the vertex of the curved reflecting surface of the mirror 13. The tube 10, mirrors 12 and 13, and correcting element 15 are all substantially coaxial.

The object source or tube face 10 has a front radius of approximately 146.05 mm. and a diameter of about 4 inches. The reflecting surface of the spherical mirror 13 has a radius of approximately 279.4 mm. the mirror 13 having a diameter of about 12 inches and the central opening therein being approximately 185 mm. in diameter. The distance along the axis of the system from the object source 10 to the mirror 13 is about 156 mm. The annular flat mirror 12 has a diameter of approximately 11 inches and a central opening of about 150 mm. in diameter, and is positioned axially about 22.7 mm. from the object source 10. The "throw" of such a system, that is, the distance from the correcting plate 15 to a remote image-receiving area or screen, is approximately 622 mm.

Disposed between the object source 10 and the correcting element 15 is a circular baffle 16 having a diameter approximately the same as the object source and located at a distance therefrom of about 77.5 mm. A diaphragm 17 is positioned between the baffle 16 and correcting element 15 and is so dimensioned that in combination with the baffle 16 prevents any light from the object source 10 from passing directly to the correcting element 15 and from there to the image-receiving area. This, therefore, prevents undesired superimposition of direct and reflected images at the receiving area. The eliminated direct light is indicated by the shaded area 19 in Fig. 1.

However, it has been found that the diaphragm 17 to function most efficiently for permitting passage of usable reflected light from the mirror 12 while blocking out direct light, should be shaped as a truncated hollow cone with its end of smallest diameter directed toward the correcting element 15. Thus, it is apparent that most of the rays "c" of light reflected by the flat mirror 12 will pass through the opening 14. It is clearly apparent that if the baffle 16 was enlarged sufficiently to entirely block out all direct light from source 10, it would also block out some of the usable rays "a" and "c," consequently decreasing the amount of light subsequently received at the image-receiving area. The same undesirable result would be obtained by forming the diaphragm 17 as a flat annular member. However, by forming the diaphragm as a truncated cone in accordance with this invention, and by proper control of the angle of the cone, the above objections are overcome since practically all the usable reflected light is permitted to travel to the image-receiving area while all direct light is blocked out.

The above construction is also adaptable to other projection optical systems of the reflective type. For example, Fig. 2 illustrates an unfolded system wherein the object source 10a emits light which passes as rays "d" onto a spherical mirror 13a which reflects the light as rays "e" backwardly through a correcting element 15a to a remote image-receiving area. A baffle 16a is inserted on the axis of the system between the object source 10a and mirror 13a and prevents a major part of the direct rays from passing directly onto the mirror 13a where they would be reflected back onto the object source 10a. Such reflection back onto the object source 10a is undesirable since such reflected light would illuminate normally dark areas of the image produced thereupon. A conical diaphragm 17a is interposed between the baffle 16a and object source 10a with its end of largest diameter directed toward the mirror 13a. This prevents the remaining direct rays, as indicated by shaded area 19a in Fig. 2, from impinging upon the mirror 13a, yet permits their rays "d" to pass both through and outside of the diaphragm 17a to the mirror 13a where they will be reflected back to the receiving area.

Fig. 3 illustrates a "Newtonian" folded system somewhat similar to the reverse folded system shown in Fig. 1 wherein light rays "f" emanating from the object source 10b pass through an opening 14b in a spherical mirror 13b onto a flat annular mirror 12b which reflects them as rays "g" back onto the spherical mirror 13b which in turn reflects them as rays "h" through the central opening 11b in the flat mirror 12b or around the edge of the flat mirror 12b as the case may be and through a correcting plate 15b toward a remote image receiving area. In this system the elements are substantially coaxial and a disk-like baffle 16b is inserted on the axis of the system between the mirrors 12b and 13b. A major part of the direct rays emanating from the object source 10b impinge upon the baffle 16b and therefore are prevented from passing onto the image-receiving area as indicated by the shaded area 19b. A conical diaphragm is inserted on the axis of the system with its end of largest diameter being positioned substantially in the opening 11b of the annular mirror 12b and with its end of smallest diameter directed toward the image-receiving area. Thus, the remaining part of the direct rays emanating from the object source 10b impinge upon the inner walls of the diaphragm 17b and are also prevented from passing to the receiving area. However, the light rays "f," "g" and "h" will be permitted to pass through the system as described above.

Systems embodying baffles and diaphragms as described above are also well adapted for further increasing the amount of light from the object source eventually received by the image-receiving area. This is accomplished by removing portions of the conical diaphragm as illustrated in Fig. 4.

In adapting the present invention to projection type television receiving apparatus, for example, it has been found that contrast of the image on the screen has been somewhat improved when the diaphragm 17c is provided with a pair of opposed scallops 18 (Fig. 4) in its end of smallest diameter. Since it is known that the picture area formed on the screen of a cathode ray tube is substantially rectangular in shape, that is, it has an overall dimension thereacross in one direction which is larger than the overall dimension thereacross in the other direction, it is apparent that such a diaphragm 17c will allow an increase in the amount of light passing to the receiving area since light rays may pass through the scallops. However, in locating the diaphragm 17c in a system such as shown in Fig. 1, for example, the diaphragm 17c should be located on the axis of the system with the scallops 18 positioned in a plane parallel with the short dimension of the picture area on the object source or tube face 10. Thus, since no light emanates from the darkened portions of the tube face outside the picture area, no direct light will pass onto the screen as would be the case if the diaphragm 17c was rotated to a position where the scallops 18 were in a plane parallel to the long dimension of the picture area.

Although no direct light is allowed to pass to the image-receiving area, it is readily apparent that additional usable light rays reflected by the flat mirror 12, in the system of Fig. 1, or the spherical mirrors 13a and 13b respectively of the systems of Figs. 2 and 3, will be permitted to pass through the scallops in the conical diaphragm. This results in the improvements desired with respect to increase in light and contrast of the image at the image-receiving plane.

It is to be understood that the actual shapes of the scallops 18 may be varied somewhat as desired to further control the amount and distribution of light passing therethrough. It should be kept in mind, however, that the scallops will preferably be restricted in size so as to permit no direct light to pass therethrough.

A schematic illustration of this feature is provided by Fig. 5 wherein a conventional circular baffle 16c is shown as occupying sufficient space to block out all direct light passing through the conical diaphragm 17c with the exception of the scallops 18 which are located opposite the dark areas of a tube face.

It is also apparent that the same results can be obtained by removing opposed edge portions of the circular baffle 16. This is schematically illustrated in Fig. 6 wherein the baffle 16a is provided with a contour shape similar to the contour shape of the picture area of a cathode ray tube. The diaphragm 17d is annular in shape with no scallops. Thus, light will pass through the system in the same manner as described in connection with the scalloped conical diaphragm and will result in similar improvements.

It is to be understood that the angle of the sides of the conical diaphragms described hereinbefore may also be varied to further control the distribution of light at the image-receiving area. That is, the sides may be angled farther away from parallelism if desired, which would result in a consequent decrease in the light transmitted to the screen due to increased blocking out of some of the usable reflected rays of light.

By constructing an optical system as described whereby the major portion of the usable light is utilized and scattered and direct light is practically entirely eliminated, it has been found that there results an increase in approximately three times as much light at the edge of the screen as is obtained in conventional projection systems and an increase in the total amount of light transmitted through the system of approximately 24%.

From the foregoing description it will be apparent that all of the objects and advantages of this invention have been accomplished. It will be apparent, however, that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. In an axially aligned reflective optical projection system embodying an object source of predetermined size and shape and reflecting means including a concave mirror coaxial therewith and effectively located to receive light rays emanating from said object source and reflect them to a receiving area to produce an image of said object source at said area, the combination of an opaque baffle disc of a size and shape smaller than the object source effectively located between said object source and the concave mirror at a position spaced from the object source and coaxial therewith, and an open-ended hollow truncated conical shaped baffle diaphragm positioned coaxial with and to one side of said disc, said conical shaped diaphragm having its smaller open end no greater than the diameter of the disc and its larger open end at least as great as the diameter of the object source whereby substantially all of the light rays emanating from said object source from any point thereon in a direction substantially parallel with the axis of the system will be intercepted, and said diaphragm being located outside the area where the path of the light rays directed to and reflected by the reflecting means cross and further having its conical shaped wall substantially parallel with the portion of the path of the light ray in which it lies whereby degradation of image in said system will be reduced.

2. An axially aligned reflective optical projection system embodying an object source of predetermined size and shape reflecting means coaxial therewith and including a concave mirror effectively located to receive light rays emanating from said object source and reflect them to a receiving area to produce an image of said object source at said area, means of a size smaller than the object source located along the axis of said system in spaced relation to the object source and coaxial therewith for rendering ineffective the light rays directed thereto from said object source, and an opaque open-ended hollow truncated cone positioned coaxial with and to one side of said means, said truncated cone having its smaller open end no greater than the diameter of the said means and its larger open end at least as great as the diameter of the object source whereby substantially all of the light rays emanating from said object source from any point thereon in a direction substantially parallel with the axis of the system will be intercepted, and said cone further being so spaced from said means and having its wall of a length and so angled to the axis of the system that substantially all of the rays that would normally reach said reflecting means and be reflected thereby will have their path substantially uninterrupted by said cone.

3. An axially aligned reflective optical projection system embodying an object source of predetermined size and shape, reflecting means including a concave mirror coaxial with said object source and spaced from said object source and shaped to receive light rays emanating from said object source and reflect them to a receiving area on the opposed side of said object source to produce an image of said object source at said area, means of a size smaller than the object source located along the axis of said system in spaced relation to the object source for rendering ineffective the light rays directed thereto from said object source, and an opaque open-ended hollow truncated cone positioned coaxial with and between said means and the object source, said truncated cone having its smaller open end no greater than the diameter of the said means and its larger open end at least as great as the diameter of the object source whereby substantially all of the light rays emanating from said object source from any point thereon in a direction substantially parallel with the axis of the system will be intercepted, and said cone further having its smaller open end directed toward the object source and having its wall of a length and so angled to the axis of the system that a majority of the rays other than paralleling the aixs of the system that would normally reach said reflecting means and be reflected thereby will have their path substantially uninterrupted by said cone, whereby degradation of image in said system will be substantially reduced with a minimum loss of light.

4. An axially aligned reflective optical projection system embodying an object source of predetermined size and shape, a concave mirror located coaxially with said object source and spaced forwardly thereof at a position such as to receive light rays emanating from said object source and reflect them to a receiving area on the opposed side of said object source to produce an image of said object source at said area, an opaque disc of a size and shape smaller than the object source spaced between said object source and the mirror in coaxial alignment therewith, and an open-ended hollow truncated conical shaped opaque diaphragm positioned coaxial with and between said disc and the object source with its smaller end toward the object source, said smaller open end of the diaphragm being no greater than the diameter of the disc and the larger open end thereof being at least as great as the diameter of the object source whereby substantially all of the light rays emanating from said object source from any point thereon in a direction substantially parallel with the axis of the system will be intercepted, and said diaphragm being so spaced from the disc and further having its conical shaped wall so angled to said axis as to permit the majority of the non-parallel light rays to be directed from the object source to said reflecting means, whereby degradation of image in said system will be substantially reduced.

5. An axially aligned reflective optical projection system embodying an object source of predetermined size and shape, a concave mirror spaced forwardly of said object source and faced to receive light rays emanating from said object source and reflect them to a receiving area on the opposed side of said object source to produce an image of said object source at said area, an opaque baffle of a size and shape smaller than the object source spaced from said object source in coaxial alignment therewith, and an opaque open-ended hollow truncated cone positioned coaxial with and between said baffle and the object source with its smaller end toward the object source, said smaller open end of the cone being no greater than the diameter of the baffle and the larger open end thereof being at least as great as the diameter of the object source whereby substantially all of the light rays emanating from said object source and which would otherwise be reflected back to said object source by the mirror are rendered ineffective, and said cone further being so positioned relative to the opaque disc and having its wall of a length and so angled to the axis of the system as to permit substantially uninterrupted passage of the remaining light rays from the object source to said reflecting means.

6. An axially aligned reflective optical projection system embodying an object source of predetermined size and shape, a first apertured concave spherical reflecting element spaced from the object source to receive light rays emanating from said object source, a second apertured plano reflecting element disposed adjacent the object source and facing the first apertured reflecting element to receive the light rays reflected by said first reflecting element and in turn reflect them through the aperture in said first reflecting element to a receiving area located beyond the first reflecting element to produce an image of the object source at said area, the light rays emanating from said object source passing through the aperture in the second reflecting element to the first reflecting element, and an opaque baffle disc located between said object source and the first reflecting element in coaxial relation therewith, said disc being of a size and shape less than that of the object source, and an open-ended hollow truncated opaque baffle cone positioned coaxial with and on the side of said disc away from the object source, said cone having its smaller open end no greater than the diameter of the disc and its larger open end at least as great as the diameter of the object source whereby substantially all of the light rays emanating from said object source from any point thereon in a direction substantially parallel with the axis of the system will be intercepted and prevented from passing directly to the image receiving area without being reflected by the first reflecting element to the second reflecting element, said cone being positioned outside the intersection of the rays directed to the first reflecting element and those reflected by said elements and with its smaller open end toward the receiving area and having its wall of a length and so angled to the axis of the system that the light rays reflected by the second reflecting element may proceed through the system to the receiving area substantially uninterrupted thereby.

7. An axially aligned reflective optical projection system embodying an object source of predetermined size and shape, a pair of spaced apertured mirrors facing each other, one being concave and the other plane, light rays from the object source passing through the aperture of one mirror to the other and the first mirror receiving light rays from the second and directing the light rays through the aperture in said second mirror to an image receiving area located beyond said mirrors on the side thereof opposed to the object source to produce an image of the object source at said area, an opaque baffle disc of a size and shape less than that of the object source located between the two mirrors in coaxial relation with said object source, and an open-ended hollow truncated opaque cone positioned coaxial with and on the side of said disc away from the object source, said cone having its smaller open end no greater than the diameter of the disc and its larger open end at least as great as the diameter of the object source whereby substantially all of the light rays emanating from said object source from any point thereon which would not be directed to the second mentioned mirror will be intercepted, said cone being positioned on the side of the disc away from the object source so as to permit free and substantially uninterrupted passage of the remaining light rays to said second mentioned mirror, and said cone further having its smaller open end toward the receiving area and its wall so angled relative to the axis of the system that it will have a generally parallel relation with the light rays reflected by the first mentioned mirror to the receiving area.

8. An axially aligned reflective optical projection system embodying an object source of predetermined size and shape and a pair of mirrors in coaxial alignment therewith, the first comprising an apertured concave spherical mirror spaced from and facing the object source to receive light rays emanating from said object source, and the other, a plane apertured mirror disposed adjacent the object source and facing the spherical mirror to receive the light rays reflected by said spherical mirror and in turn reflect them through the aperture in said spherical mirror to a receiving area located beyond said spherical mirror to produce an image of the object source at said area, the light rays emanating from said object source passing through the aperture in the plane mirror to the spherical mirror, and an opaque baffle disc of a size and shape less than that of the object source located between the two mirrors in coaxial relation therewith, and an open-ended hollow truncated opaque cone positioned coaxial with and on the side of said disc away from the object source, said cone having its smaller open end no greater than the diameter of the disc and its larger open end at least as great as the diameter of the object source whereby substantially all of the light rays emanating from said object source from any point thereon which would not be directed to the spherical mirror will be intercepted, said cone being so positioned on said side of the disc away from the object source as to permit substantially uninterrupted and free passage of the remaining light rays to the spherical mirror, and said cone further having its smaller open end toward the receiving area and its wall so angled relative to the axis of the system that it will have a generally parallel relation with the light rays reflected by the plane mirror to the receiving area.

9. An axially aligned reflective optical projection system embodying an object source of predetermined size and shape, an apertured plane mirror spaced from and facing the object source in axial alignment therewith to receive light rays emanating from said object source, an apertured concave spherical mirror disposed adjacent the object source and facing the plane mirror in axial alignment therewith to receive the light rays reflected by said plane mirror and in turn reflect them to a receiving area located beyond said plane mirror to produce an image of the object source at said area, the light rays emanating from said object source passing through the aperture in the spherical mirror to the plane mirror, and an axially aligned opaque baffle disc of a size and shape less than that of the object source located between the two mirrors, and an open-ended hollow truncated opaque cone positioned coaxial with and on the side of said disc away from the object source, said cone having its smaller open end no greater than the diameter of the disc and its larger open end at least as great as the diameter of the object source whereby substantially all of the light rays emanating from said object source from any point thereon which would not be directed to the plane mirror will be intercepted, said cone being so positioned on the side of the disc away from the object source as to substantially uninterrupt passage of the remaining light rays to the plane mirror, and said cone further having its smaller open end toward the receiving area and its wall so angled relative to the axis of the system that it will have a generally parallel relation with the light rays reflected by the spherical mirror to the receiving area.

10. In a reflective optical projection system, the combination of an object source of predetermined size and shape, concave reflective means coaxial therewith and located for directing to an image plane light rays originating at said object source, said reflective means having an effective reflecting surface of annular shape, and baffle means in said system embodying an opaque disc effectively located on the optical axis of the system and spaced from the object source, said opaque disc having a diameter less than that of the object source, and a hollow truncated conical shaped open-ended opaque diaphragm coaxially related with said opeque disc, the larger end of said conical shaped diaphragm being at least as great as the object source and its smaller end at least as small as the disc, said disc and diaphragm being so located along said axis and relative to the object source, image plane and reflective means that together they will intercept substantially all light rags emanating from the object course and directed parallel to said axis while permitting a majority of the remaining light rays to reach the reflective means, and said diaphragm further having its wall acutely angled with respect to the axis of the system and so directed as to be nearly parallel with the part of the path of said remaining light rays in which it lies so as to reduce its interruption of said remaining light rays emanating from the object source and directed other than parallel with said axis of the system whereby an image substantially free of degradation is obtained without serious loss of usuable light.

11. In an axially aligned reflective optical projection system, the combination of an object source of predetermined size and shape, concave reflective means coaxial therewith and a spherical aberration correction element disposed between said reflective means and a predetermined image plane, said concave reflective means being located for directing an image of said object source through said correction element to said image plane, said concave reflective means having an effective reflecting surface of annular shape, and baffle means in said system embodying an opaque disc effectively located on the optical axis of the system and spaced from the object source, said opaque disc having a diameter less than that of the object source, and a hollow truncated conical shaped open-ended opaque diaphragm coaxially related with and having its end of larger diameter disposed toward said opaque disc, said larger end of the diaphragm being at least as great as the object source and its smaller end at least as small as the disc, said disc and diaphragm being so located along said axis and relative to the object source, image plane, correction element and reflective means that together they will intercept substantially all light rays emanating from the object source and directed parallel to said axis while permitting a majority of the remaining light rays to reach the reflective means, and said diaphragm further having its wall acutely angled with respect to the axis of the system and so directed as to be nearly parallel with the part of the path of said remaining light rays in which it lies so as to reduce its interruption of said remaining light rays emanating from the object source and directed other than parallel with said axis of the system whereby an image substantially free of degradration is obtained without serious loss of usuable light.

12. An axially aligned reflective optical projection system comprising the combination of an object source of predetermined size and shape, a centrally apertured concave spherical mirror and a centrally apertured plane mirror facing each other in coaxial relation and located forwardly of the object source, a spherical aberration correction element disposed on the opposed side of said mirrors in coaxial relation therewith, and said mirrors being air-spaced from each other, the object source and the correction element at operative distances for directing light rays from said object source through the correction element to a predetermined image plane, and baffle means in said system embodying an opaque disc effectively located on the optical axis of the system and spaced from the object source between said two mirrors, said opaque disc having a diameter less than that of the object source, and a hollow truncated conical shaped open-ended opaque diaphragm coaxially related with and disposed on the side of the disc toward the correction element and further having its end of larger diameter disposed toward said opaque disc, said larger end of the diaphragm being at least as great as the object source and its smaller end at least as small as the disc, said disc and diaphragm being so located along said axis and relative to the object source, image plane and mirrors that together they will intercept substantially all light rays emanating from the object source and directed parallel to said axis, the size and position of said disc relative to the two mirrors and the length and angle of the wall of said conical-shaped diaphragm being such as to permit a majority of the light rays emanating from the object source and directed other than parallel with said axis of the system to be directed and reflected by the mirrors from the object source toward and to the image plane whereby an image substantially free of degradation will be obtained without serious loss of usual light.

13. In an axially aligned reflective optical projection system for directing light rays to a receiving area from an object area of a controlled size and contour shape having an overall dimension in one direction which is different than the overall dimension thereacross in the opposite direction, reflecting means coaxially arranged with said object area and having an annular-like concave spherical reflecting surface spaced for receiving light rays emanating from said object area and reflecting them toward said receiving area, and baffle means in said system for preventing passage of light rays from said object area directed other than to said annular-like reflecting surface and which would tend to degrade the resultant image, said baffle means comprising an opaque disc-like member interposed in the optical path between said object and receiving area in axial alignment therewith, said disc being of a diametric size smaller than the object area for blocking out a majority of said image-degrading light rays, and an open-ended hollow truncated opaque conical member to one side of said disc-like member in concentric relation therewith and having its side wall disposed at an acute angle to the axis of the system with its larger end as great as the largest dimension of the object area for preventing passage of the remainder of the image-degrading light rays from said object area, the angle of said side wall permitting a majority of the light rays reflected by said reflecting means to pass toward said receiving area, and one of the opaque members having opposed edge portions removed therefrom in the areas thereof aligned with the sides of the object area having the shorter dimension whereby an increase in the amount of light reflected to said receiving area is provided without substantial degradation of the image.

14. In an axially aligned reflective optical projection system for directing light rays to a receiving area from an object source of a controlled contour shape having an overall dimension in one direction which is different than the overall dimension thereacross in the opposite direction, reflecting means including a concave mirror coaxial with said object source and effectively facing and spaced from said object source for receiving said light rays emanating from said object source and reflecting them toward said receiving area, said concave mirror having an effectively useful reflecting surface of annular shape, and baffle means in said system for preventing degradation of image by intercepting light rays from said object source effectively directed other than to said annular reflecting surface of the concave mirror comprising an opaque disc-like member interposed in the optical path from said object source in substantial axial alignment therewith for blocking out a majority of said image-degrading light rays, and an opaque diaphragm to one side of and coaxial with said disc having a hollow truncated conical-shaped wall acutely angled to the axis of said system with its larger end as great as the object source so as to intercept the remainder of the image-degrading light rays, the angle of said wall permitting a majority of the light rays reflected by said reflecting area to pass toward said receiving area, said diaphragm further having a pair of opposed recesses of controlled size and shape in the edge thereof at the end of smallest diameter, and said recesses being located in alignment with the sides of the object area having the smaller dimension whereby an increase is provided in the amount of reflected light which is permitted to pass to the receiving area and without substantially degrading the image.

15. In an axially aligned reflective optical projection system for directing light rays to a receiving area from an object source of a controlled contour shape having an overall dimension in one direction which is different than the overall dimension thereacross in the opposite direction, concave reflecting means having an effectively useful reflecting area of annular shape disposed in coaxial relation with the object source and effectively positioned for receiving light rays emanating from said object source and reflecting them toward said receiving area, and baffle means in said system for preventing degradation of the image at said receiving area by light rays emanating from said object source and directed in parallel relation to the axis of said system comprising an opaque disc-like member of a diameter smaller than the object source interposed in the optical path between said object source and receiving area for blocking out a majority of said light rays effecting image degradation, and an open-ended hollow truncated opaque diaphragm of conical shape adjacent to and coaxial with said opaque disc, said diaphragm having its smaller end no greater than the disc and its larger end at least as large as the object source for preventing passage of the remainder of said light rays effecting image degradation, and said diaphragm further having its sides so acutely angled to the axis of said system as to permit a majority of the light rays reflected by said reflecting area to pass toward said receiving area, said diaphragm further having a pair of opposed recesses of controlled size and shape in the edge thereof at the end of smallest diameter, and said recesses being located in alignment with the sides of the object area having the least dimension whereby an increase is provided in the amount of reflected light which is permitted to pass to the receiving area without substantial degradation of the image.

16. In an axially aligned reflective optical projection system for directing light rays to a receiving area from an object source of a controlled contour shape having an overall dimension in one direction which is different than the overall dimension thereacross in the opposite direction, concave reflecting means coaxial with and spaced from the object source for receiving said light rays emanating from said object source and reflecting them toward said receiving area, said reflecting means having an effectively useful reflecting area of annular shape, and baffle means in said system for preventing passage of light rays parallelling the axis of said system so as to degrade the image of said object source at said receiving area comprising an opaque disc-like member interposed in the optical path between said object source and receiving area in coaxial relation therewith for blocking out a majority of light rays directed other than to said reflecting area, said disc-like member being of a diametric size smaller than the object source, and an opaque diaphragm on one side of said disc having a hollow truncated conical wall acutely angled with its larger end at least as great as the largest dimension of the object source to intercept the remainder of said axis paralleling light rays from said object source directed other than to the reflecting area, the diaphragm being so positioned and its wall being so angled as to permit a majority of the non-parallel light rays to pass uninterrupted, said disc-like member having opposed marginal portions thereof removed, and said removed marginal portions being of a controlled size and shape and located in the system in alignment with the sides of the object area having the least dimension whereby an increase is provided in the amount of reflected light which is permitted to pass to the receiving area.

References Cited in the file of this patent

UNITED STATES PATENTS

| | | |
|---|---|---|
| 1,650,591 | Beechlyn | Nov. 29, 1927 |
| 1,699,108 | Halvorson | Jan. 15, 1929 |
| 1,943,511 | Bauersfeld | Jan. 16, 1934 |
| 2,295,779 | Epstein | Sept. 15, 1942 |
| 2,309,788 | Ramberg | Feb. 2, 1943 |
| 2,324,133 | Burgess | July 13, 1943 |
| 2,449,345 | Van Alphen | Sept. 14, 1948 |
| 2,476,124 | Van Alphen | July 12, 1949 |
| 2,482,566 | Traub | Sept. 20, 1949 |
| 2,492,461 | Bouwers | Dec. 27, 1949 |
| 2,504,383 | Bouwers et al. | Apr. 18, 1950 |

FOREIGN PATENTS

| | | |
|---|---|---|
| 544,694 | Great Britain | Apr. 23, 1942 |